US012335417B2

(12) United States Patent
Karame et al.

(10) Patent No.: US 12,335,417 B2
(45) Date of Patent: Jun. 17, 2025

(54) BOOTSTRAPPING ROOT OF TRUST FOR FEDERATED BLOCKCHAINS

(71) Applicant: NEC Laboratories Europe GmbH, Heidelberg (DE)

(72) Inventors: Ghassan Karame, Heidelberg (DE); Sebastien Andreina, Heidelberg (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 294 days.

(21) Appl. No.: 17/908,564

(22) PCT Filed: Mar. 25, 2020

(86) PCT No.: PCT/EP2020/058259
§ 371 (c)(1),
(2) Date: Sep. 1, 2022

(87) PCT Pub. No.: WO2021/190740
PCT Pub. Date: Sep. 30, 2021

(65) Prior Publication Data
US 2023/0344659 A1 Oct. 26, 2023

(51) Int. Cl.
*H04L 9/00* (2022.01)
*H04L 9/32* (2006.01)
*H04L 9/40* (2022.01)

(52) U.S. Cl.
CPC ............... *H04L 9/50* (2022.05); *H04L 9/32* (2013.01); *H04L 63/123* (2013.01)

(58) Field of Classification Search
CPC ............ H04L 9/50; H04L 9/32; H04L 63/123
USPC ........................................................ 713/176
See application file for complete search history.

(56) References Cited

U.S. PATENT DOCUMENTS

| 10,681,175 | B2  |   | 6/2020  | Li |
|------------|-----|---|---------|--------------------------|
| 11,757,850 | B2  | * | 9/2023  | Silberman ...... G06F 21/60 |
|            |     |   |         | 713/168 |
| 2018/0113752 | A1 |   | 4/2018  | Derbakova et al. |
| 2018/0309567 | A1 | * | 10/2018 | Wooden ............ H04L 63/12 |
| 2019/0220603 | A1 |   | 7/2019  | Gopalakrishnan et al. |

(Continued)

FOREIGN PATENT DOCUMENTS

| JP | 2020/508594 A  | 3/2020  |
|----|----------------|---------|
| WO | 2019/141984 A1 | 7/2019  |
| WO | 2019/186747 A1 | 10/2019 |

OTHER PUBLICATIONS

Li,Wenting et al.; Towards Scalable and Private Industrial Blockchains'; Proceedings of the ACM Workshop on Blockchain; Apr. 2, 2017; pp. 9-14; Association for Computing Machinery; NewYork, USA (Year: 2017).*

(Continued)

*Primary Examiner* — Thanh T Le
(74) *Attorney, Agent, or Firm* — Leydig, Voit & Mayer, Ltd.

(57) ABSTRACT

Methods and systems for supporting trusted communication between nodes from different blockchains are provided. The method comprises using a bootstrapping service for bootstrapping trust among blockchains of a group of federated blockchains. The bootstrapping service records security parameters of the federated blockchains. The security parameters include information on consensus configurations of the federated blockchains.

20 Claims, 3 Drawing Sheets

(56) References Cited

U.S. PATENT DOCUMENTS

| | | | |
|---|---|---|---|
| 2019/0253263 A1* | 8/2019 | Qiu | H04L 63/102 |
| 2019/0287105 A1* | 9/2019 | Fedorov | G06Q 20/401 |
| 2019/0363874 A1* | 11/2019 | Shirley | G06Q 20/3827 |
| 2020/0233950 A1* | 7/2020 | Assenmacher | G06F 21/44 |
| 2021/0021431 A1* | 1/2021 | Guim Bernat | H04L 9/3239 |
| 2021/0026844 A1 | 1/2021 | Koide | |
| 2021/0091926 A1* | 3/2021 | Ramaswamy | G06F 11/0709 |
| 2022/0038884 A1* | 2/2022 | Shen | H04W 8/06 |
| 2023/0013074 A1* | 1/2023 | Kikinis | G06Q 20/40145 |
| 2024/0054243 A1* | 2/2024 | Page | G06F 21/6227 |

OTHER PUBLICATIONS

Li, Wenting et al.; "Towards scalable and private industrial blockchains"; *Proceedings of the ACM Workshop on Blockchain*; Apr. 2, 2017; pp. 9-14; Association for Computing Machinery; New York, USA.

Back, Adam et al.; *Enabling Blockchain Innovations with Pegged Sidechains*; Oct. 22, 2014; pp. 1-25; [Online] Available on: http://www.opensciencereview.com/papers/123/enablingblockchain-innovations-with-pegged-sidechains.

Gai, Fangyu et al.; *A Secure Consensus Protocol for Sidechains*; Jun. 15, 2019; pp. 1-19; v.1; arXiv:1906.06490v1; ArXiv e-Print archive; Cornell University; Ithaca, New York, USA.

Fuchida, Yasuyuki; "ブロックチェーンと金融取引の革新" ("Blockchain and Financial Transaction Innovation"); *Special feature: Innovation and Finance*; Nov. 1, 2015; pp. 11-35; vol. 19, No. 2, Art. No. 74; Nomura Institute of Capital Markets Research; Tokyo, Japan.

\* cited by examiner

BOOTSTRAPPING ROOT OF TRUST FOR FEDERATED BLOCKCHAINS

CROSS-REFERENCE TO PRIOR APPLICATIONS

This application is a U.S. National Phase application under 35 U.S.C. § 371 of International Application No. PCT/EP2020/058259, filed on Mar. 25, 2020. The International Application was published in English on Sep. 30, 2021 as WO 2021/190740 under PCT Article 21(2).

FIELD

The present invention relates to a method and a system for supporting trusted communication between nodes from different blockchains.

BACKGROUND

Blockchain technology has been widely discussed and adopted in many use cases such as payment systems, identity management and supply chain management. As most of these blockchain use cases are permission-based, they maintain their own private ledgers that cannot be accessed by the respective other chains. However, nodes in different blockchain often need to share some information, and in fact, one of the surging requirements today for blockchains is that they need to communicate with each other. More specifically, there is a need to form federated blockchains which allows nodes from different blockchains to exchange information or transfer assets.

The biggest challenge for federated blockchains to communicate with each other is that they have to presume or trust the consensus protocols used by the respective other blockchains. The state of the art has suggested several solutions of federated blockchains such as satellite chains (as described, e.g., in W. Li, A. Sforzin, S. Fedorov and G. O. Karame, "Towards scalable and private industrial blockchains," in *Proceedings of the ACM Workshop on Blockchain,* 2017) and sidechains (as described, e.g., in A. Back, M. Corallo, L. Dashjr, M. Friedenbach, G. Maxwell, A. Miller, A. Poelstra, J. Timón and P. Wuille, "Enabling Blockchain Innovations with Pegged Sidechains," 2014.

The mentioned chains are called satellite chains or sidechains because they usually involve a main chain or parent chain to verify every cross-chain transactions; or else they assume or trust the consensus configuration of the other chains with which they communicate. For example, cross-chain transactions introduced in the above-mentioned work by A. Back et al. about pegged sidechain always involve a parent chain. Moreover, it only assumes that the parent chain as well as the sidechain use proof of work (PoW) consensus protocol and does not consider that sidechains may use different consensus protocols.

Another related technology, which is referred to as Vulcan (described, e.g., in F. Gai, C. Grajales, J. Niu and C. Feng, "A Secure Consensus Protocol for Sidechains arXiv: 1906.06490v1," arXiv preprint arXiv:1906.06490, 2019), has a similar restriction except that it assumes BFT as the consensus protocol of the chains. In both solutions, the parent chain or mainchain is constantly involved in asset transactions among sidechains.

The satellite chains introduced in the above-mentioned work by W. Li et al. allows cross-chain asset transfer without involving any "mainchain", and it does not presume any consensus protocols used by the satellite chains. However, neither of the above solutions provides a way for the satellite chains or sidechains to verify the consensus configuration of each other, which is a prerequisite of verifying the finality proofs of any received transactions from another satellite chain.

SUMMARY

In an embodiment, the present invention provides a method for supporting trusted communication between nodes from different blockchains, the method comprising: using a bootstrapping service for bootstrapping trust among the different blockchains of a group of federated blockchains, wherein the bootstrapping service records security parameters of the federated blockchains, wherein the security parameters comprise information on consensus configurations of the federated blockchains.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
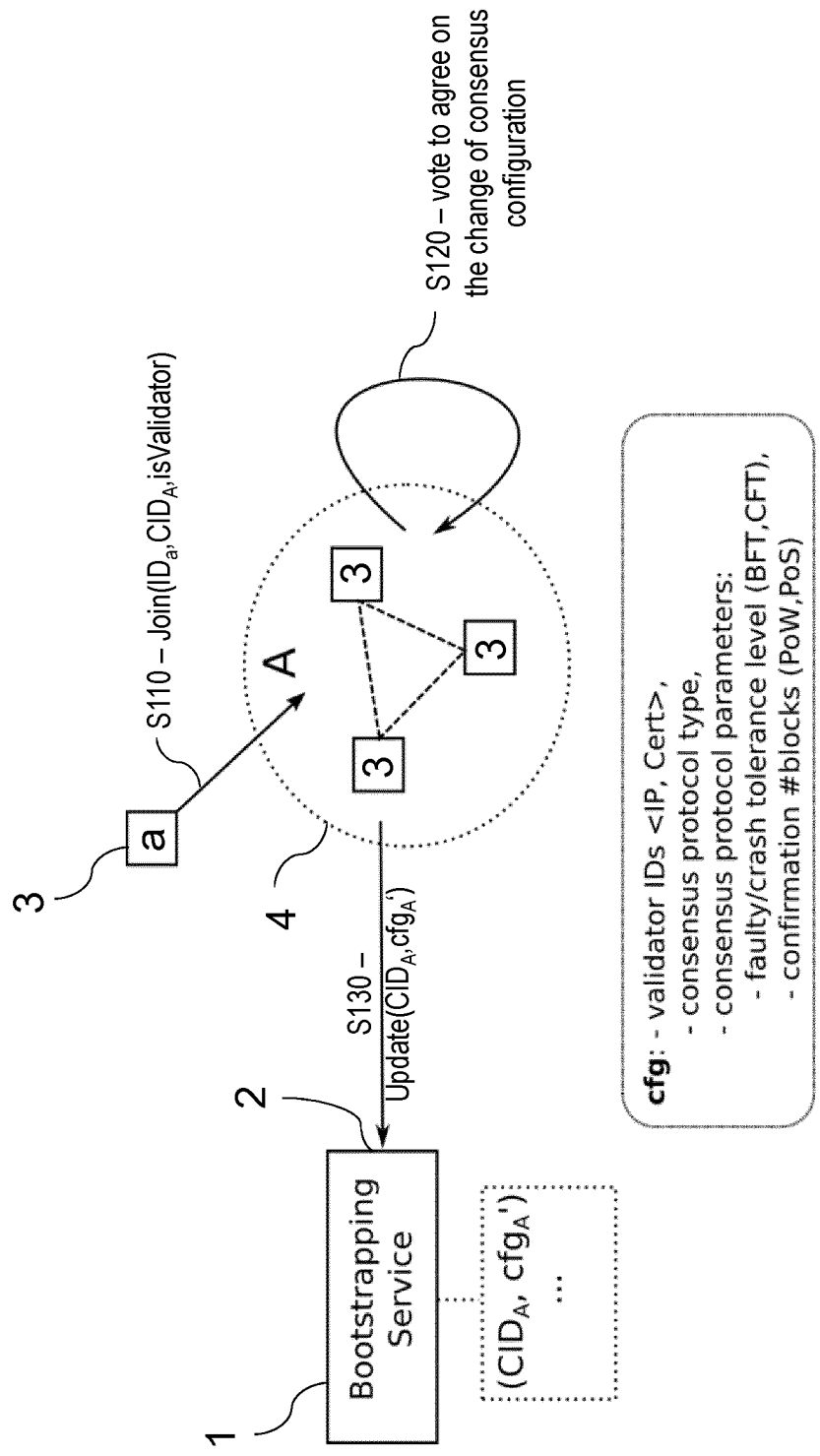
FIG. 1 is a schematic diagram illustrating a blockchain consensus configuration update in a bootstrapping service upon a new node joining the blockchain in accordance with embodiments of the invention.

The present invention improves and further develops a method and a system for supporting trusted communication between nodes from different blockchains in such a way that the blockchains can validate finality proofs of transactions among each other without involvement of a mainchain.

In an embodiment, the present invention provides a method for supporting trusted communication between nodes from different blockchains, the method comprising using a bootstrapping service for bootstrapping trust among blockchains of a group of federated blockchains, wherein the bootstrapping service records security parameters of the federated blockchains, the security parameters including information on the consensus configurations of the federated blockchains.

Furthermore, the present invention provides a system for supporting trusted communication between nodes from different blockchains, the system comprising a bootstrapping service for bootstrapping trust among blockchains of a group of federated blockchains, wherein the bootstrapping service is configured to record security parameters of the federated blockchains, the security parameters including information on the consensus configurations of the federated blockchains.

According to the invention, it has been recognized that a bootstrapping service that is configured to record security parameters of the federated blockchains, the security parameters including in particular information on the consensus configurations of the federated blockchains, can be utilized in a reliable and efficient way to bootstrap the trust among federated blockchains. In this regard, the bootstrapping service may serve as a foundation for cross-chain transaction verification. According to embodiments, the bootstrapping service may be configured to maintain all the consensus configurations of the other blockchains in the system, and may allow nodes to register, update and inquire the consensus information of other blockchains, so that the finality proofs of cross-chain transactions can be verified in a trustworthy manner. While the invention requires trust for the bootstrapping service, it does not require involving a mainchain to verify every cross-chain transaction.

According to embodiments, the bootstrapping service may act for multiple blockchains, which constitute a group of federated blockchains. For instance, it may be provided that blockchains can register with the bootstrapping service to participate in the federation. Generally, in the context of the present disclosure, a blockchain (hereinafter sometimes briefly denoted as chain) is a peer-to-peer overlaid network that consists of multiple nodes who, through a certain distributed consensus protocol, collaboratively maintain a distributed ledger. The content of the ledger is duplicated among the nodes so that a blockchain network provides robustness against node corruption. Messages, also mentioned as transactions, are propagated among the nodes to update the state of the ledger. Nodes who actively maintain the ledger are denoted as validators, as they validate transactions and vote in the consensus process in order to update the ledger. The other nodes who only passively get updates of the ledger are called non-validators.

According to embodiments, the security parameters recorded by the bootstrapping service may include, but are not limited to, the IDs of all the chain validators of the federated blockchains and information on the consensus configuration of a federated blockchains. The latter may include information on the types of the underlying consensus algorithms and the protocol configuration parameters (e.g., confirmation length in PoW, faulty tolerance and network size in BFT (Byzantine Fault Tolerance) and CFT (Crash Fault Tolerance)).

According to an embodiment, in order to create a comprehensive information base at the bootstrapping service, it may be provided that the bootstrapping service records all changes of the consensus configurations of the federated blockchains.

In particular, such change of a consensus configuration may be caused by the joining of a new validator node to any of the federated blockchains. For these cases, the bootstrapping service may be configured to receive an updated consensus configuration from a federated blockchain, together with the blockchain's corresponding finality proof. Furthermore, the bootstrapping service may be configured to verify the received finality proof of the updated consensus configuration based on the original consensus configuration recorded for that particular blockchain. In case the verification is successful, the bootstrapping service may record the updated consensus configuration in place of the original consensus configuration, which may be deleted.

According to an embodiment, in order to further enhance the comprehensiveness of the information base at the bootstrapping service, the bootstrapping service may be configured to record any new blockchain established within the group of federated blockchains together with the new blockchain's consensus configuration.

For these cases, the bootstrapping service may be configured to receive a first registration request for a new blockchain to be established, which may be sent by a first validator node of the new blockchain to be established. According to embodiments, the registration request may include at least the consensus configuration of the new blockchain together with identification information of the validator nodes of the new blockchain. In this context, it should be noted that the nodes may have agreed off-line on the IDs and the consensus configuration of the new chain. The bootstrapping service may be further configured to add a new record for the new blockchain to be established, wherein the new record specifies a current status of the new blockchain as pending.

When the bootstrapping service receives a second or any further registration request for the new blockchain (sent by a second or any further validator node), it may determine for each received registration request, based on the consensus configuration of the new blockchain to be established, whether the list of validator nodes having sent their registration request is already complete or not. In case the list of validator nodes having already sent their registration request is determined to be complete, the bootstrapping service may update the status of the new blockchain from pending into ready. Otherwise, the bootstrapping service may append the validator node having sent its registration request to a list and wait for further registration requests.

According to embodiments of the invention, the bootstrapping service may use the recorded consensus configurations of the federated blockchains by providing a first blockchain information on the consensus configuration of a second blockchain, in order to enable the first blockchain to verify a finality proof of the first blockchain on a particular transaction. In such contexts, the bootstrapping service enables a particular chain B to transfer some assets to another chain A of the federation and proof to chain A that a particular transaction is finalized in chain B.

In this regard, according to an embodiment, a first one of the federated blockchains may initiate a cross-chain transaction with a second one of the federated blockchains by transmitting the transaction together with the first blockchain's finality proof of the transaction to the second blockchain. The second blockchain may then request the bootstrapping service for information on the first blockchain's consensus configuration. The bootstrapping service may be configured to return the requested information on the first blockchain's consensus configuration to the second blockchain. Finally, the second blockchain may then, based on the first blockchain's consensus configuration, verify the first blockchain's finality proof of the transaction and accept the transaction in case the verification is successful.

According to embodiments, the bootstrapping service may be a trusted third party. In this case, it may be supposed that the certificate of the trust third party is known and trusted by all (validator) nodes of all federated blockchains participating or being involved in the system.

According to some embodiments, the bootstrapping service may be a decentralized system that, for instance, utilizes replicated state such as a blockchain. In this case it may be supposed that the consensus configuration of the decentralized bootstrapping service is pre-defined and known by all (validator) nodes of all federated blockchains participating or being involved in the system.

Embodiments of the present invention build upon the understanding that for federated blockchains to communicate with each other, they have to presume or trust the consensus protocols used by the other blockchains. This is because in order to verify that a transaction has been settled in another blockchain, the receiving chain needs to know the network quorum size and the consensus protocol type and parameters of the source chain. More specifically, the finality or the settlement of a transaction depends on the consensus protocol adopted by the corresponding blockchain. For example, if a blockchain uses Practical Byzantine Fault Tolerance (PBFT) as its consensus protocol, and the quorum size is 2f+1 nodes, where f is the tolerance of faulty nodes in the network. Then the blockchain who receives the finality proof of the transaction needs to check if the number of validating nodes in the source blockchain is at least n=3f+1, and whether the finality proof contains at least f+1 valid signatures from the validating nodes. This can be very challenging, as these blockchains do not share the information about network and consensus protocol configuration, and what's more, there is no established trust among these blockchains to verify this information.

To address these problems, embodiments of the invention provide a method and a system that aim at bootstrapping the trust among federated blockchains, which may then serve as a foundation for, e.g., cross-chain transaction verification. According to embodiments, the method and the system make use of or comprise a bootstrapping service, which may be configured to maintain all the consensus configurations of the blockchains involved in a federation of blockchains. The bootstrapping service may allow nodes to register, update and inquire the consensus information of blockchains, so that the finality proofs of cross-chain transactions can be verified in a trustworthy manner.

In some embodiments, the bootstrapping service 1 may comprise at least an input/output interface 2 for allowing interactions with nodes 3 of the blockchains 4, e.g. receiving and transmitting messages, one or more processors, and a memory (i.e., a computer-readable storage medium). As will be appreciated by those skilled in the art, in order to enable communication/interactions among the named components, they may be interconnected, possibly together with further functional components or modules not specifically mentioned herein, by means of a bus system.

The one or more processors may include, for instance, a microprocessor, a central processing unit (CPU) of a computing device and/or any other dedicated special purpose processor or suitable programmable device. The processors may be configured to retrieve from the memory and execute, among other things, computer executable instructions related to the processes and methods described herein. In embodiments, the computer executable instructions are locally stored and accessed from a non-transitory computer readable medium, such as a hard drive or flash drive. A Read Only Memory (ROM) may include computer executable instructions for initializing the processors, while a Random-Access Memory (RAM) may be deployed for loading and processing instructions executed by the processors. Furthermore, a network interface may be provided that connects the bootstrapping service 1 to a wired network or cellular network and to a local area network or wide area network, such as the Internet.

In some embodiments of the current invention, the bootstrapping service 1 may be operated by a trusted third party. In this case, it is assumed that the certificate of the bootstrapping service 1 is known and trusted by all nodes 3 in the system, i.e. by all nodes 3 of the federated blockchains 4 participating or being involved in the system.

According to alternative embodiment of the current invention, the bootstrapping service 1 may be implemented in form of a decentralized system with replicated state such as a blockchain. In this case, it is assumed that the consensus configuration of the decentralized bootstrapping service 1 is pre-defined and known by all nodes 3 in the system, i.e. by all nodes 3 of the federated blockchains 4 participating or being involved in the system. Specifically, the consensus configuration of the decentralized bootstrapping service 1 may include the type of the underlying consensus protocol, e.g., PoW (Proof of Work), BFT (Byzantine Fault Tolerance), CFT (Crash Fault Tolerance), the protocol parameters (e.g., confirmation length in PoW, faulty tolerance and network size in BFT and CFT), and the IDs of the chain validators, wherein the ID information may include the connection information of a node 3 as well as its certificate.

According to embodiments of the invention, the bootstrapping service 1, regardless of its specific implementation, maintains the consensus configuration information of all the chains 4 in the system. The record of the consensus configuration of a new blockchain 4 may be in the form of (CID, ⟨pending_validator_list⟩, cf g, status). CID denotes the chain ID, which is unique in the system, pending_validator_list records the nodes 3 who have registered the new chain 4 before the new chain 4 is established, cfg includes the consensus configuration of the chain 4, and status of the chain 4 can be PENDING/READY.

FIG. 1 illustrates a process for updating the bootstrapping service's 1 records in case a new node 3 (denoted a in FIG. 1) joins an existing chain 4 (denoted A in FIG. 1) as a validator. It is assumed that the consensus configuration of chain A is already registered (with chain ID $CID_A$) in the bootstrapping service 1 as $cfg_A$.

As shown at step S110, in order to join blockchain A, node a sends a request transaction Join($ID_a$, $CID_A$, isValidator) to blockchain A. The transaction is signed by the corresponding private key of the certificate of a. The term isValidator is a Boolean value that indicates whether the node a wants to join the chain A as a validator, which may affect the blockchain's A consensus configuration.

At step S120, the validator nodes 3 of chain A vote for the join request of node a. If the validator nodes 3 agree with this operation, they generate an updated version of its consensus configuration $cfg'_A$ and the corresponding proof. The updated configuration may include the ID information of the new validator a, as well as the changes to the protocol parameters, if there are any. The proof of the configuration update depends on the underlying consensus protocol. For example, if the consensus protocol configuration before the update was PBFT with n=4 and f=1, then the proof includes at least 2 signatures of the validators in chain A.

At step S130, chain A sends its updated consensus configuration $cfg'_A$ as well as its proof generated in step S120 to the bootstrapping service 1 as transaction Update($CID_A$, $cfg'_A$). The bootstrapping service 1 first looks up the original consensus configuration $cfg_A$ of chain A. Then it verifies the proof of $cfg'_A$ based on $cfg_A$. When this transaction is settled, the bootstrapping service 1 updates its record as ($CID_A$, $cfg'_A$, READY) for chain A, where READY is the status of the chain.

According to an embodiment, when the bootstrapping service 1 is implemented as a decentralized system, as described above, the validation of the Update message may be carried out by the validator nodes of the bootstrapping service 1 system, and the chain status may be maintained in a distributed ledger.

The process described in connection with FIG. 1 ensures that the records/ledger (depending on the implementation) of the bootstrapping service 1 are always updated, i.e. the records/ledger always contain updated information about the applicable consensus configurations of all federated blockchains participating or being involved in the system.

Figure 2:
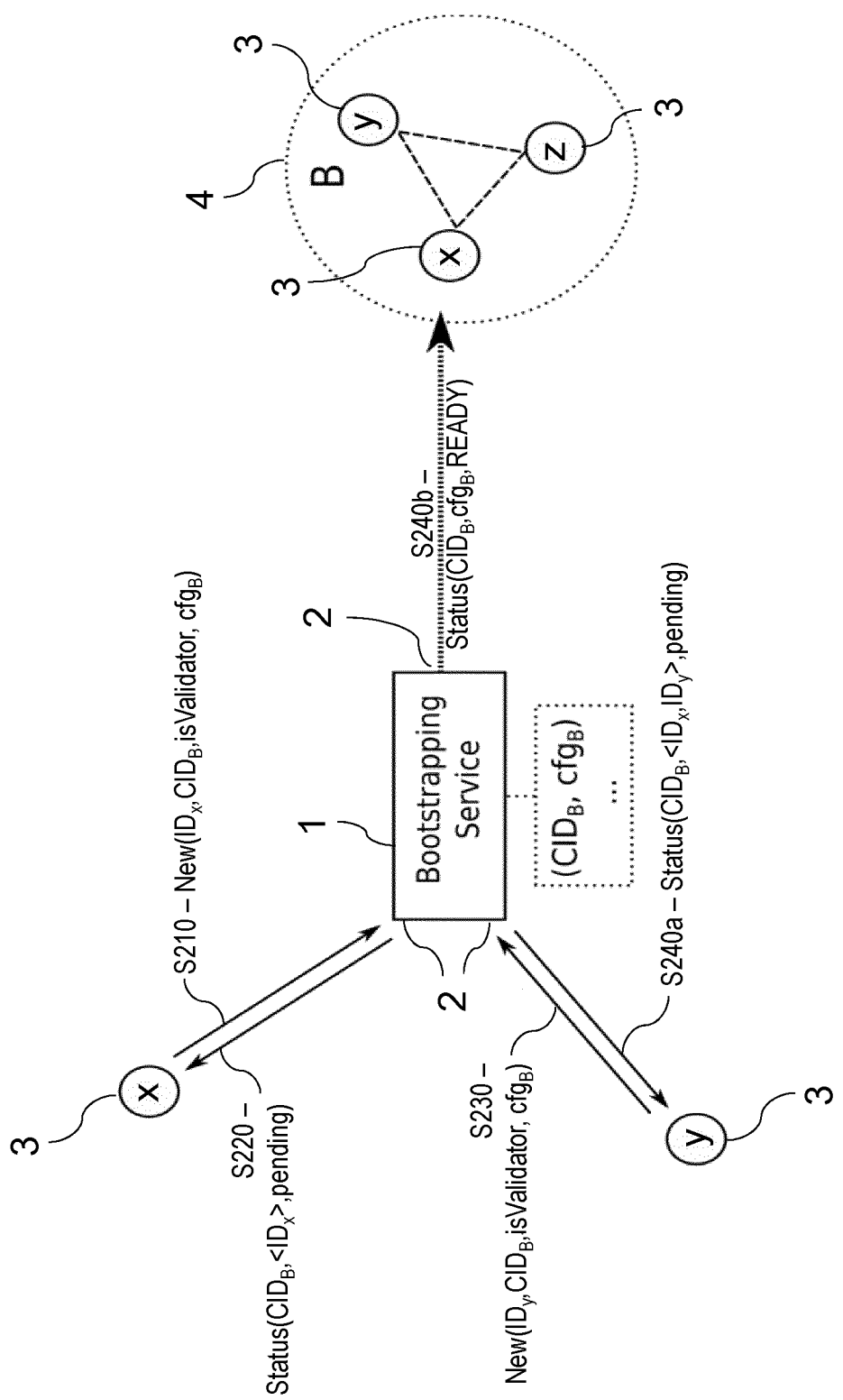
FIG. 2 is a schematic diagram illustrating a process of establishing and registering a new blockchain through the bootstrapping service in accordance with embodiments of the invention.

FIG. 2 depicts an exemplary process according to an embodiment of the invention that illustrates how the bootstrapping service 1 is informed about the creation of any new blockchains and how such new blockchains can be registered in the bootstrapping service's 1 register. More specifically, FIG. 2 illustrates a scenario in which a group of nodes 3, represented by the exemplary nodes denoted x and y in FIG. 2, establishes and registers a new chain 4 (denoted B in FIG. 2) in the bootstrapping service 1. In the illustrated embodiment it is assumed that the nodes x and y (or, in general terms, all nodes that participate in the new chain creation) have agreed offline on the IDs and the consensus configuration of the new chain B as ($CID_B$, $cfg_B$).

First, as shown at step S210, node x sends a transaction New($ID_x$, $CID_B$, isValidator, $cfg_B$) to the bootstrapping service 1 that is intended to instruct the bootstrapping service 1 to open a new record for a new blockchain with chain ID $CID_B$ and the consensus configuration $cfg_B$, and in which node x with ID $ID_x$ is a validator node 3. It should be recalled that the consensus configuration $cfg_B$ includes the IDs of the validators in chain B.

At step S220, the bootstrapping service 1 first validates the signature of the transaction and then checks whether $ID_x$ is included in $cfg_B$. Further, the bootstrapping service 1 looks up the information about $CID_B$ in its record or in its ledger, depending on the implementation. Since chain B is not registered yet, the bootstrapping service 1 simply adds a record ($CID_B$, $cfg_B$, $\langle ID_x \rangle$, PENDING) in its record/ledger. Meanwhile, the bootstrapping service 1 returns the current status of the requested chain to node x as Status($CID_B$, $\langle ID_x \rangle$, PENDING).

As shown at step S230, another node 3, i.e. node y, sends a transaction New($ID_y$, $CID_B$, isValidator, $cfg_B$) to the bootstrapping service 1. It should be noted that, in practice, this step is carried out by all nodes 3 that participate in the creation of the new chain B.

Similar to step S220, at step S240, the bootstrapping service 1 validates the transaction signature and checks whether $ID_y$ is included in $cfg_B$. Then the bootstrapping service 1 retrieves the record ($CID_B$, $cfg_B$, $\langle ID_x \rangle$, PENDING) to compare whether the received configuration $cfg_B$ is consistent for the new chain B.

If the list of validator nodes 3 is complete, then the bootstrapping service 1 updates the status of the chain B as ($CID_B$, $cfg_B$, READY) and propagates it to all founder nodes, as shown at S240a; otherwise, it appends the new node y in the list as ($CID_B$, $cfg_B$, $\langle ID_x, ID_y \rangle$, PENDING), as shown at S240b, and waits for more chain registration requests.

The processes described in connection with FIGS. 1 and 2 may be carried out regularly such that the bootstrapping service 1 is constantly updated both with consensus configuration changes of existing blockchains 4 (e.g., due to a change of the composition of the respective validator nodes 3) and with new blockchains 4 and their respective consensus configurations. Based thereupon, FIG. 3 illustrates an exemplary embodiment of a process of a cross-chain transaction realized through the bootstrapping service 1.

Figure 3:
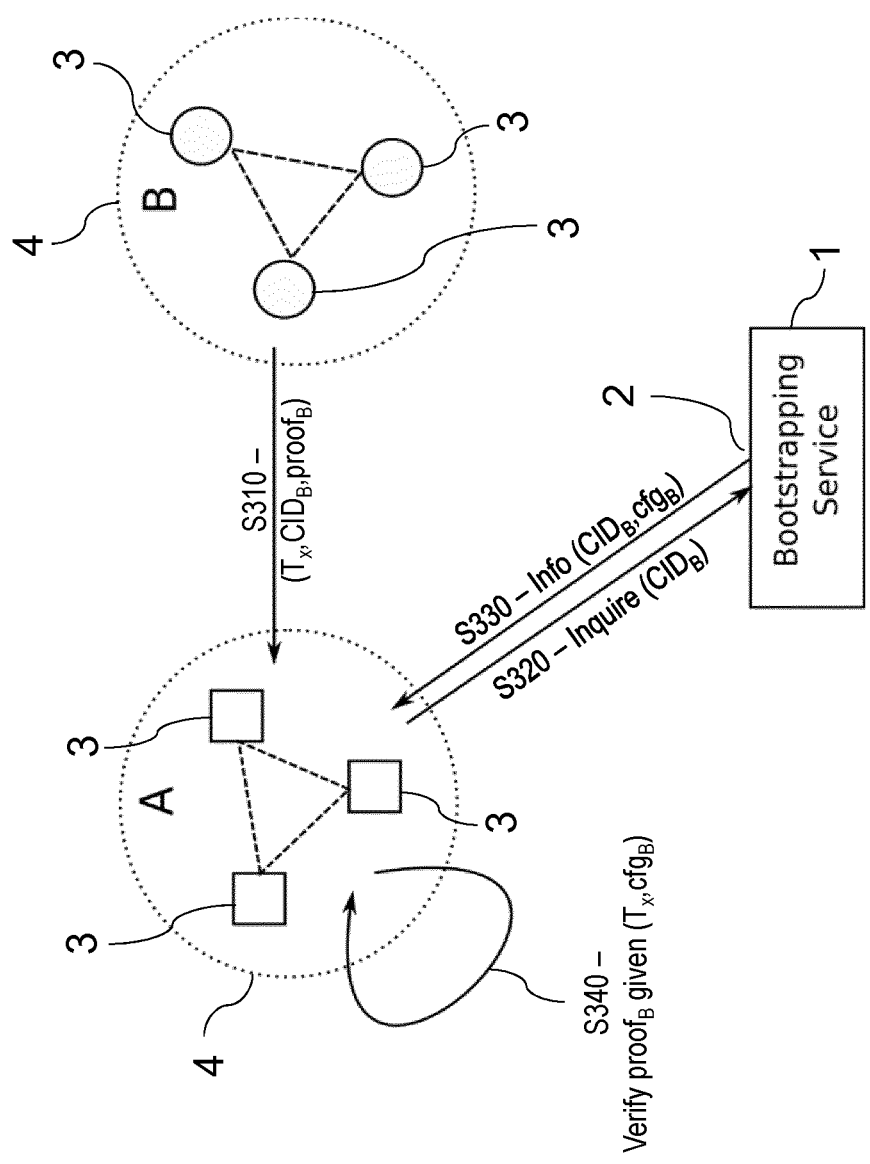
FIG. 3 is a schematic diagram illustrating a process of accomplishing a transaction between two blockchains through the bootstrapping service in accordance with embodiments of the invention.

According to the illustrated embodiment, two chains 4, denoted chain A and chain B in FIG. 3, accomplish a cross-chain transaction through the bootstrapping service 1, wherein it is supposed that chain B wants to transfer some assets and it wants to prove to chain A that a certain transaction Tx is finalized in chain B. In the context of the present disclosure, the term 'transaction' is to be understand in the broadest sense, and other cross-chain transactions different from the ones explicitly mentioned herein may be accomplished likewise by implementing and utilizing the bootstrapping service 1 in accordance with the methods described herein. In particular, as will be appreciated by those skilled in the art, transactions may include monetary transactions, but also data about property exchanges, entities involved in a supply chain, and votes in elections, to name just a few examples.

As shown at S310, in a first step chain B sends the transaction Tx together with its chain identity ($CID_B$) and its finality proof ($proof_B$) of the transaction Tx to chain A, for instance in a message of the form (Tx, $CID_B$, $proof_B$).

In a next step, as shown at S320, chain A inquires the bootstrapping service 1 for the consensus configuration of chain B. According to an embodiment, this may be accomplished by sending a message Inquire($CID_B$) to the bootstrapping service 1.

The bootstrapping service 1 maintains the requested information in its records/ledger, namely as a result of the procedures described above in connection with FIGS. 1 and 2. Accordingly, upon receipt of the inquire from chain A, the bootstrapping service 1 retrieves the requested consensus configuration information of chain B from its records/ledger and returns this information to chain A, for instance by way of sending a message of the form Info($CID_B$, $cfg_B$), as shown at step S330. According to embodiments, it may be provided that this consensus configuration information received from the bootstrapping service 1 is cached on the validator nodes 3 in chain A, so that repeated inquiries can be avoided.

Finally, at step S340, chain A, by utilizing the consensus configuration $cfg_B$ received from the bootstrapping service 1 at step 330, verifies the finality proof $proof_B$ based on the input Tx, as received from chain B in step S310. If the validation passed successfully, the asset transfer from chain B to chain A is accepted. Otherwise, the asset transfer will be denied or rejected.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for supporting trusted communication between nodes from different blockchains, the method comprising:
    using a bootstrapping service for bootstrapping trust among the different blockchains of a group of federated blockchains, wherein the bootstrapping service records security parameters of the federated blockchains, wherein the security parameters comprise information on consensus configurations of the federated blockchains, and wherein the bootstrapping service records a change of a recorded original consensus configuration of a federated blockchain, from the federated blockchains, caused by joining of a new validator node to the federated blockchain;
    receiving, by the bootstrapping service and from the federated blockchain, an updated consensus configuration together with the federated blockchain's corresponding finality proof;
    verifying, by the bootstrapping service, the finality proof of the updated consensus configuration based on the recorded original consensus configuration of the federated blockchain; and
    based on the verification being successful, recording, by the bootstrapping service, the updated consensus configuration.

2. The method according to claim 1, wherein the information on the consensus configuration of the federated blockchains recorded by the bootstrapping service includes a type of a consensus protocol, protocol configuration, and parameters and identification information of validator nodes associated with the federated blockchains.

3. The method according to claim 1, wherein the bootstrapping service further comprises transaction verification, wherein one of the federated blockchains verifies a transaction of another one of the federated blockchains based on the consensus configuration information of the respective other blockchain obtained from the bootstrapping service.

4. The method according to claim 1, wherein the bootstrapping service records any new blockchain established within the group of federated blockchains together with the new blockchain's consensus configuration.

5. The method according to claim 4, further comprising:
    receiving, by the bootstrapping service, a first registration request for the new blockchain to be established sent by a first validator node of the new blockchain to be established, wherein the first registration request includes at least the consensus configuration of the new blockchain together with identification information of the validator nodes of the new blockchain; and
    adding, by the bootstrapping service, a new record for the new blockchain to be established, wherein the new record specifies a current status of the new blockchain as pending.

6. The method according to claim 5, further comprising:
    receiving, by the bootstrapping service, a second or any further registration request for the new blockchain sent by a second or any further validator node; and
    determining, by the bootstrapping service, for each received registration request, based on the consensus configuration of the new blockchain to be established, whether a list of validator nodes having sent their registration request is complete.

7. The method according to claim 6, further comprising:
    updating, by the bootstrapping service, the current status of the new blockchain to be established from pending into ready, in case the list of validator nodes having already sent their registration request is determined to be complete; and
    otherwise, appending the validator node having sent its registration request to a list and waiting for further registration requests.

8. The method according to claim 1, further comprising:
    initiating, by a first one of the federated blockchains, a cross-chain transaction with a second one of the federated blockchains, by transmitting the transaction together with the first blockchain's finality proof of the transaction to the second blockchain;
    requesting, by the second blockchain, the bootstrapping service for information on the first blockchain's consensus configuration;
    returning, by the bootstrapping service, the requested information on the first blockchain's consensus configuration to the second blockchain; and
    verifying, by the second blockchain, the first blockchain's finality proof of the transaction based on the first blockchain's consensus configuration and accepting the transaction in case the verification is successful.

9. A system for supporting trusted communication between nodes from different blockchains, the system comprising:
    one or more processors; and
    a tangible, non-transitory computer-readable medium having instructions thereon which, upon being executed by the one or more processors, provide for execution of a method comprising:
        using a bootstrapping service for bootstrapping trust among blockchains of a group of federated blockchains, wherein the bootstrapping service is configured to record security parameters of the federated blockchains, wherein the security parameters comprise information on consensus configurations of the federated blockchains, and wherein the bootstrapping service records a change of a recorded original consensus configuration of a federated blockchain, from the federated blockchains, caused by joining of a new validator node to the federated blockchain;
        receiving, by the bootstrapping service and from the federated blockchain, an updated consensus configuration together with the federated blockchain's corresponding finality proof;
        verifying, by the bootstrapping service, the finality proof of the updated consensus configuration based on the recorded original consensus configuration of the federated blockchain; and
        based on the verification being successful, recording, by the bootstrapping service, the updated consensus configuration.

10. The system according to claim 9, wherein using the bootstrapping service comprises recording any new blockchain established within the group of federated blockchains together with the new blockchain's consensus configuration.

11. The system according to claim 9, wherein using the bootstrapping service comprises supporting cross-chain transactions between different blockchains by providing a first one of the federated blockchains information on the consensus configuration of a second one of the federated blockchains.

12. The system according to claim 11, wherein providing the first one of the federated blockchains the information on the consensus configuration of the second one of the federated blockchains is based on upon a request from the first one of the federated blockchains.

13. The system according to claim 9, wherein the bootstrapping service includes a trusted third party.

14. The system according to claim 9, wherein the bootstrapping service includes a replicated system with replicated state.

15. A method for supporting trusted communication between nodes from different blockchains, the method comprising:
- using a bootstrapping service for bootstrapping trust among the different blockchains of a group of federated blockchains, wherein the bootstrapping service records security parameters of the federated blockchains, wherein the security parameters comprise information on consensus configurations of the federated blockchains, wherein the bootstrapping service records any new blockchain established within the group of federated blockchains together with the new blockchain's consensus configuration;
- receiving, by the bootstrapping service, a first registration request for the new blockchain to be established sent by a first validator node of the new blockchain to be established, wherein the first registration request includes at least the consensus configuration of the new blockchain together with identification information of the validator nodes of the new blockchain; and
- adding, by the bootstrapping service, a new record for the new blockchain to be established, wherein the new record specifies a current status of the new blockchain as pending.

16. The method according to claim 15, wherein the information on the consensus configuration of the federated blockchains recorded by the bootstrapping service includes a type of a consensus protocol, protocol configuration, and parameters and identification information of validator nodes associated with the federated blockchains.

17. The method according to claim 15, wherein the bootstrapping service further comprises transaction verification, wherein one of the federated blockchains verifies a transaction of another one of the federated blockchains based on the consensus configuration information of the respective other blockchain obtained from the bootstrapping service.

18. The method according to claim 15, further comprising:
- receiving, by the bootstrapping service, a second or any further registration request for the new blockchain sent by a second or any further validator node; and
- determining, by the bootstrapping service, for each received registration request, based on the consensus configuration of the new blockchain to be established, whether a list of validator nodes having sent their registration request is complete.

19. The method according to claim 18, further comprising:
- updating, by the bootstrapping service, the current status of the new blockchain to be established from pending into ready, in case the list of validator nodes having already sent their registration request is determined to be complete; and
- otherwise, appending the validator node having sent its registration request to a list and waiting for further registration requests.

20. The method according to claim 15, wherein the bootstrapping service is associated with a trusted third party.

* * * * *